Figure 5:
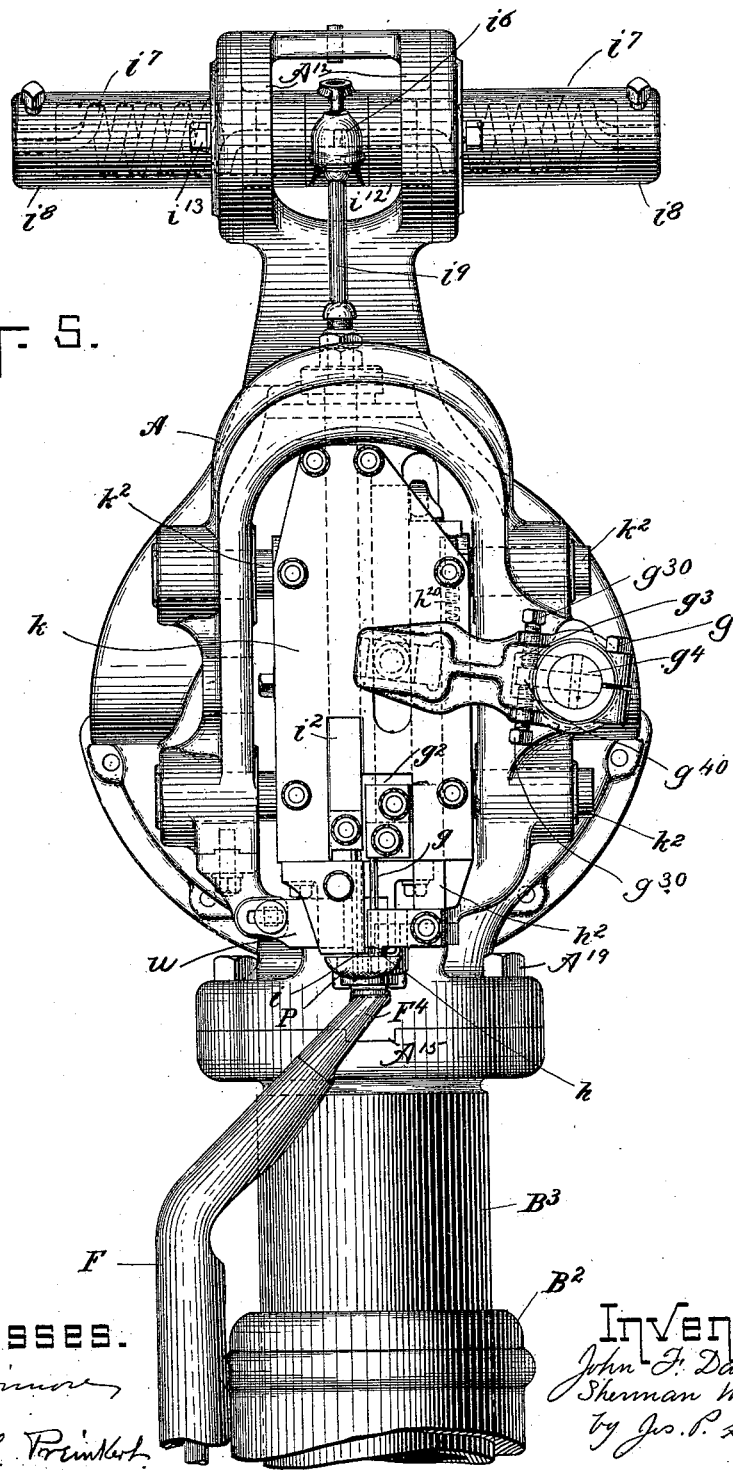

(No Model.) 10 Sheets—Sheet 1.
J. F. DAVEY & S. W. LADD.
PEGGING MACHINE.
No. 581,066. Patented Apr. 20, 1897.
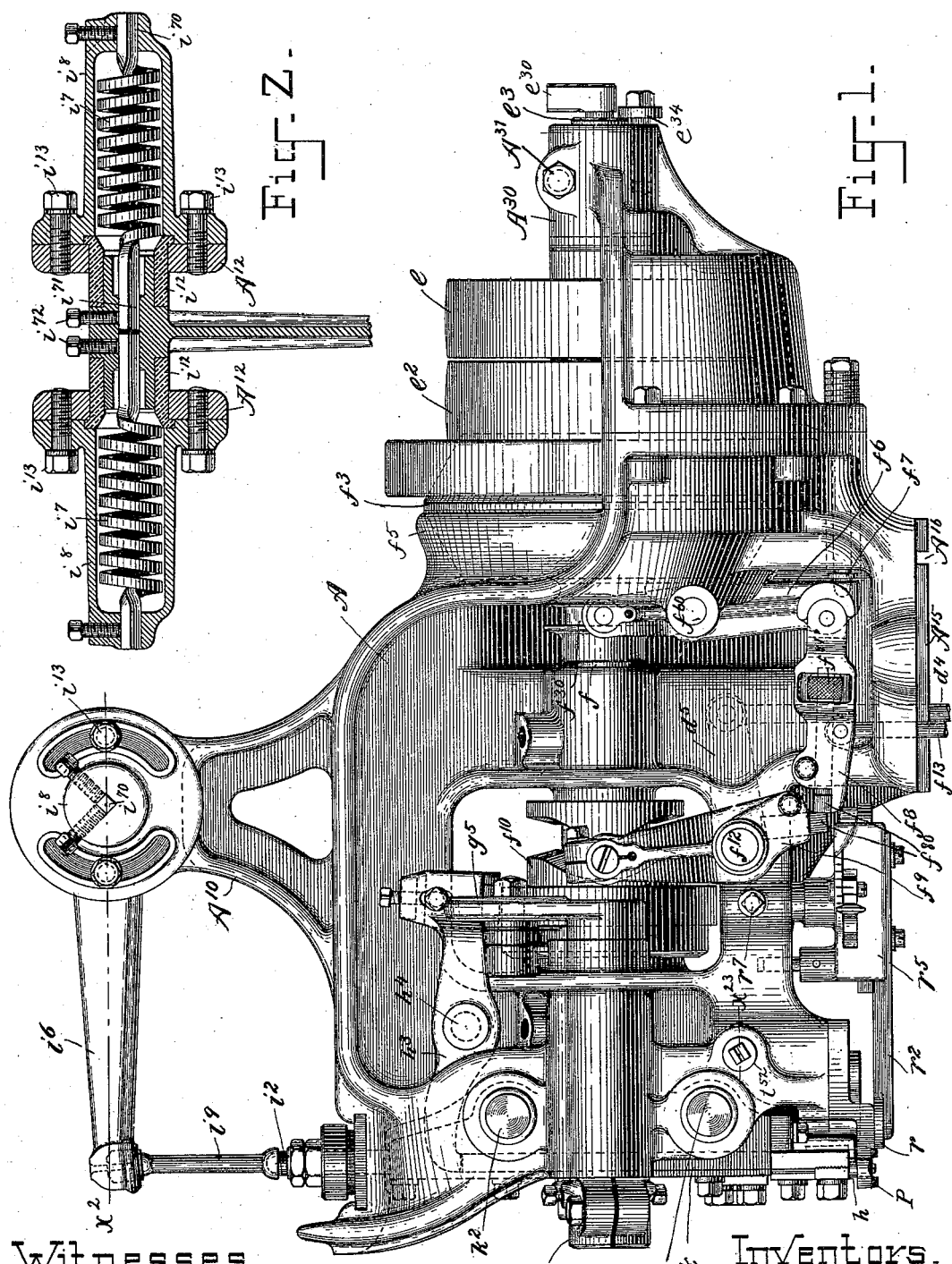
Witnesses.
Inventors.
John F. Davey
Sherman W. Ladd
by Jno. P. Livermore
Atty.

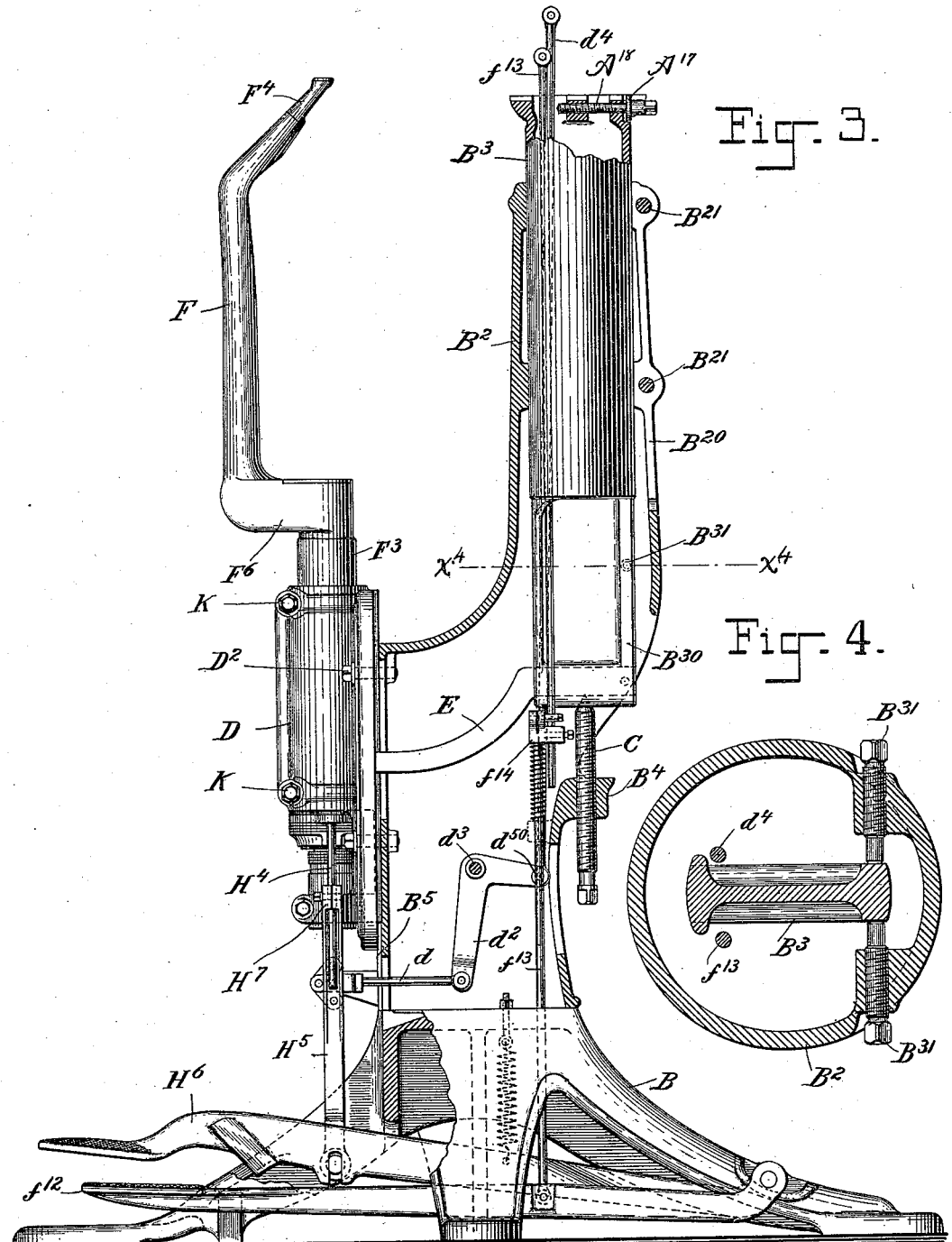

(No Model.) 10 Sheets—Sheet 3.
J. F. DAVEY & S. W. LADD.
PEGGING MACHINE.

No. 581,066. Patented Apr. 20, 1897.

Witnesses. Inventors.

(No Model.) 10 Sheets—Sheet 4.

J. F. DAVEY & S. W. LADD.
PEGGING MACHINE.

No. 581,066. Patented Apr. 20, 1897.

Witnesses. Inventors.

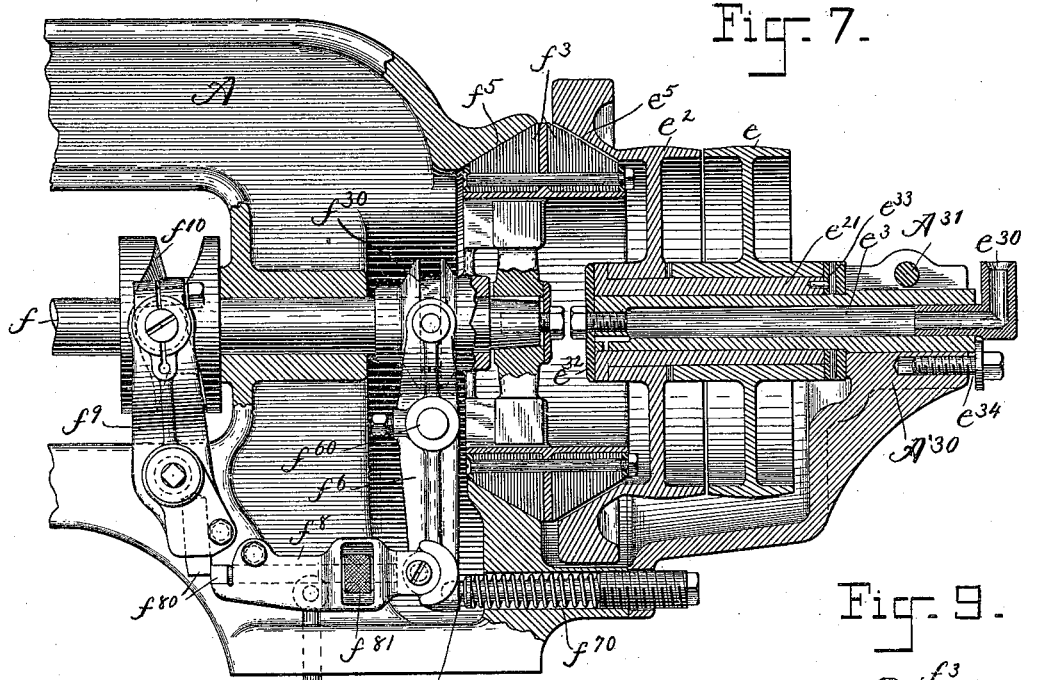
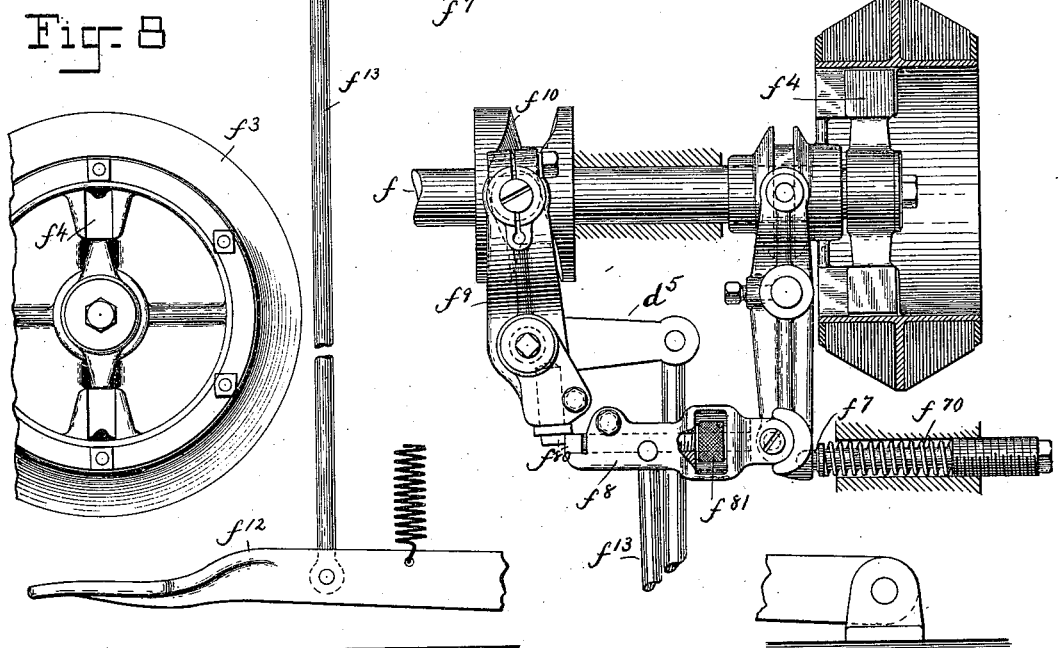

(No Model.) J. F. DAVEY & S. W. LADD. 10 Sheets—Sheet 6.
PEGGING MACHINE.
No. 581,066. Patented Apr. 20, 1897.
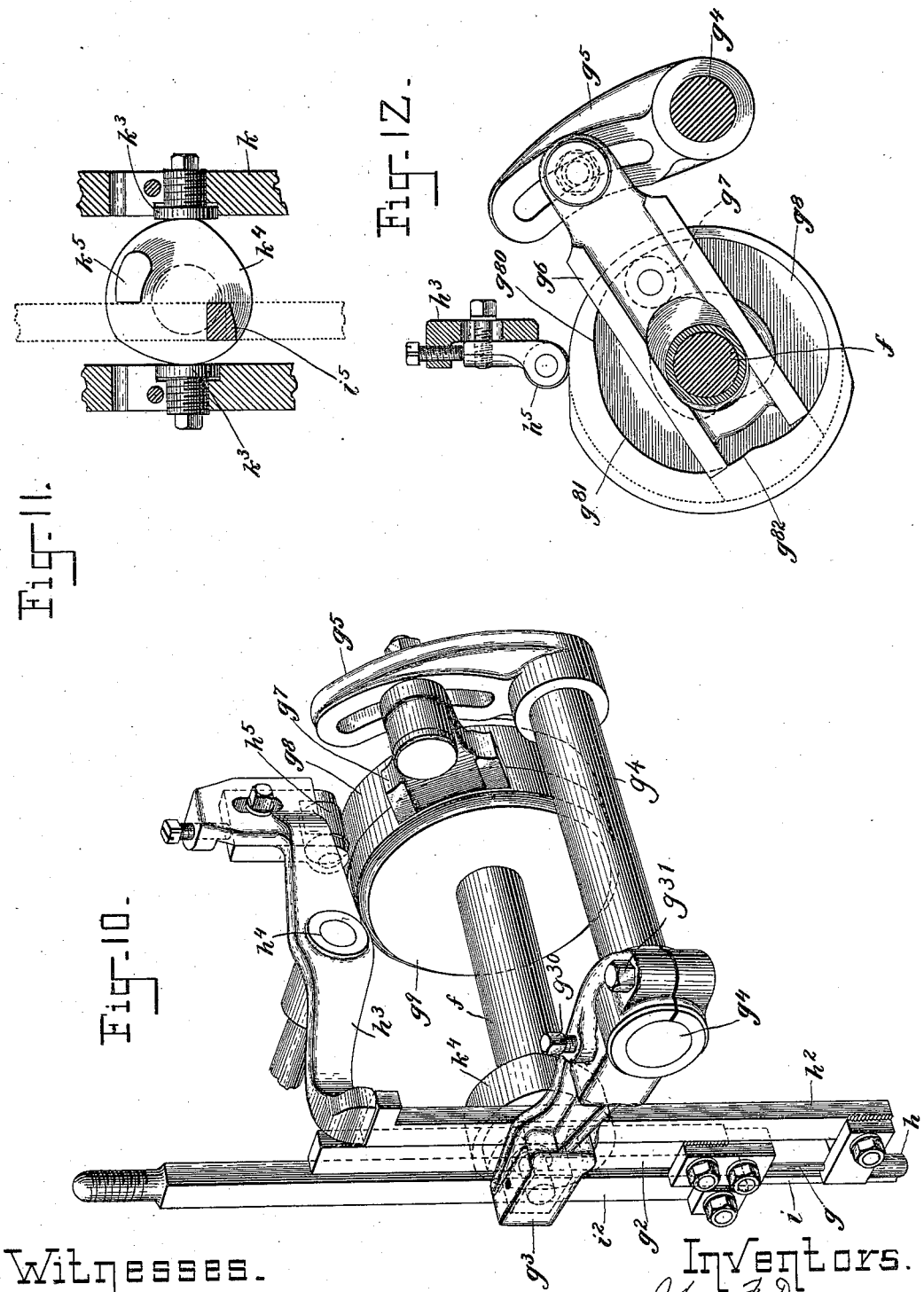

(No Model.)　　　　J. F. DAVEY & S. W. LADD.　　10 Sheets—Sheet 7.
PEGGING MACHINE.

No. 581,066.　　　　　　　　　　Patented Apr. 20, 1897.

Witnesses.

Inventors.
John F. Davey
Sherman W. Ladd
by Jno. P. Livermore
Atty.

(No Model.)  
J. F. DAVEY & S. W. LADD.  
PEGGING MACHINE.  
No. 581,066. Patented Apr. 20, 1897.
10 Sheets—Sheet 8.
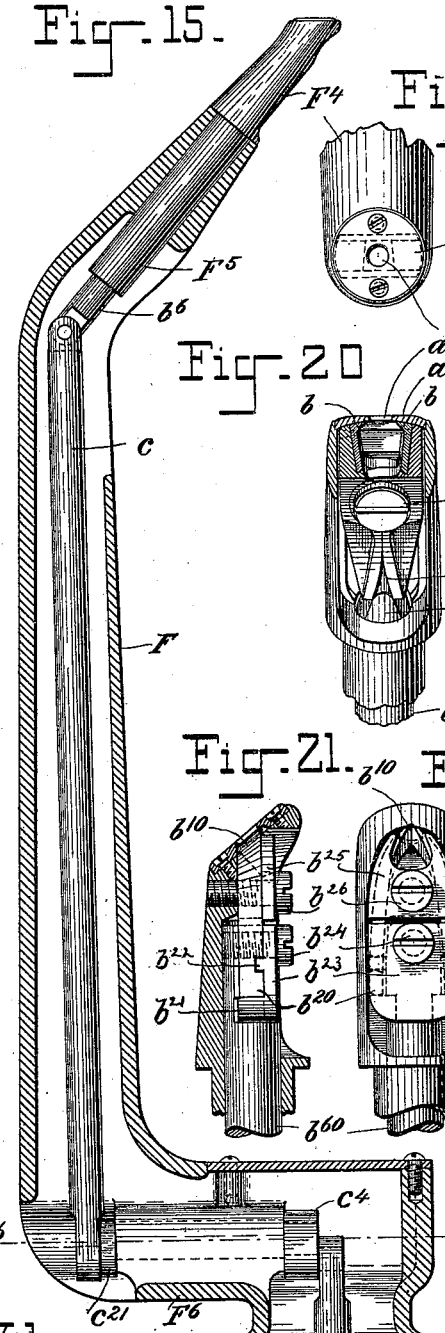
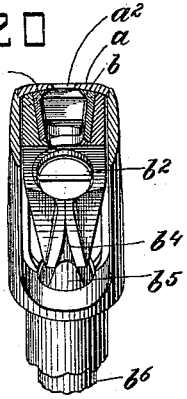
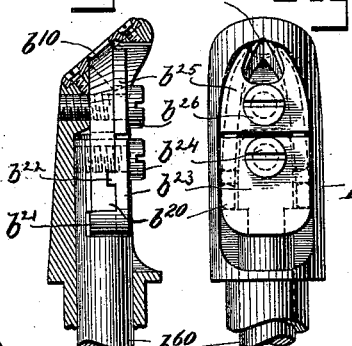
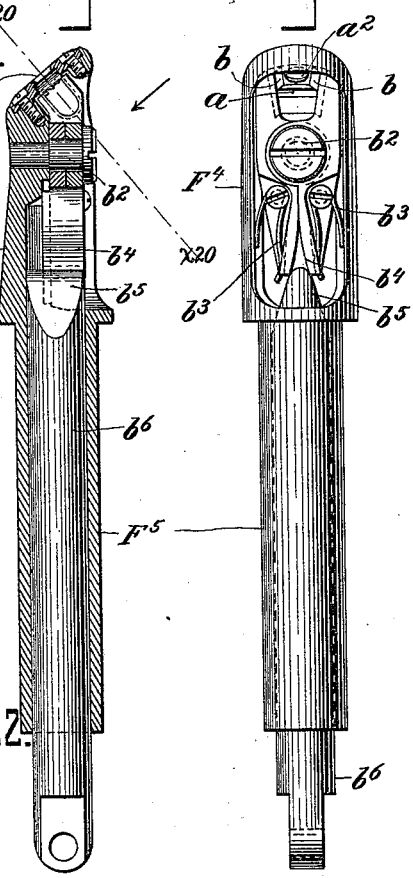
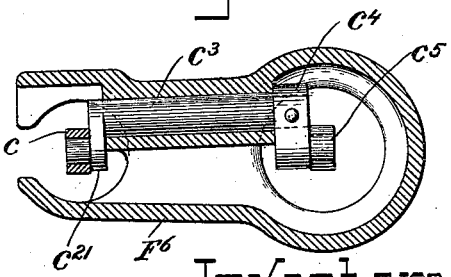
Witnesses  
Inventors  
John F. Davey  
Sherman W. Ladd  
by Jas. P. Livermore  
Atty.

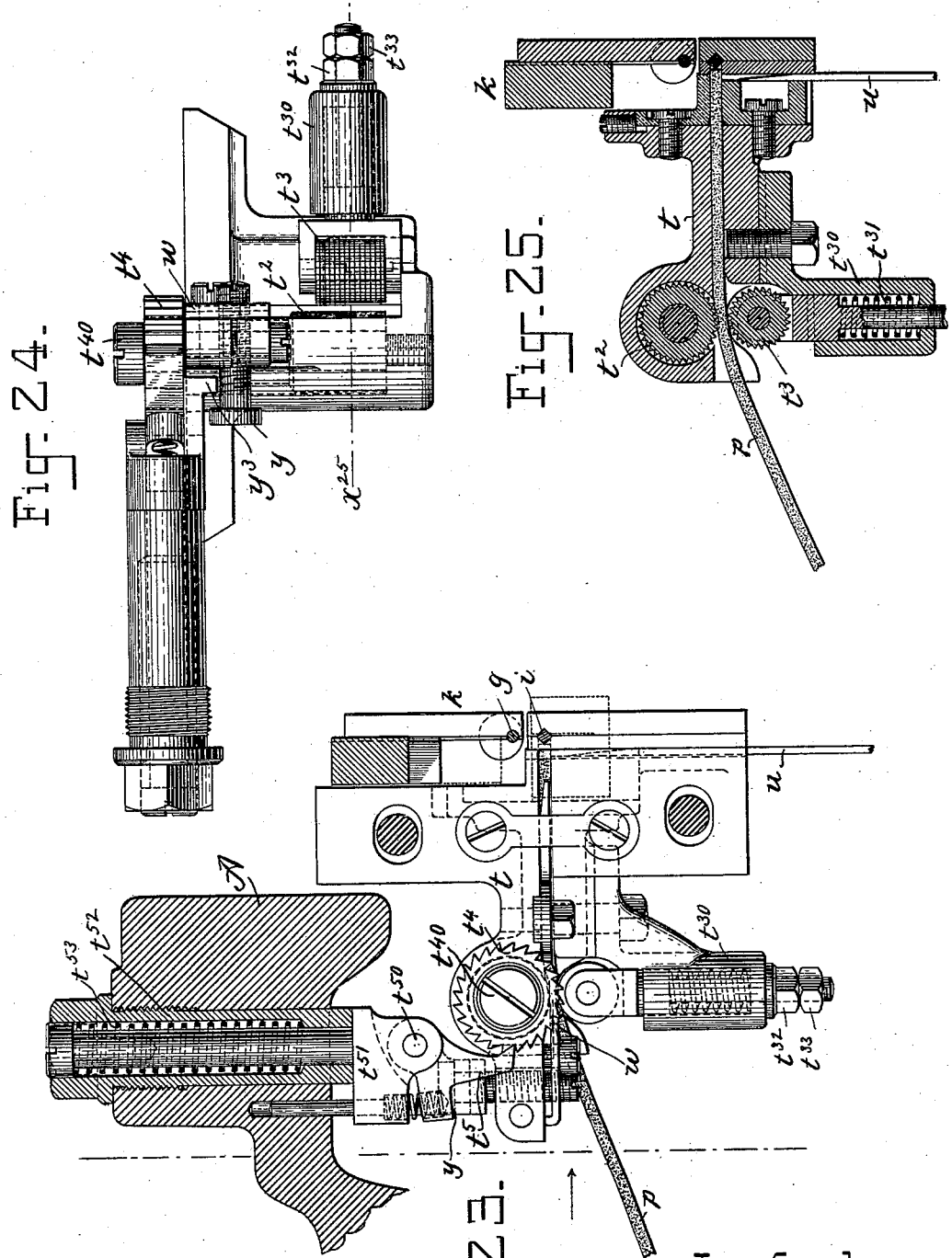

(No Model.) 10 Sheets—Sheet 10.
J. F. DAVEY & S. W. LADD.
PEGGING MACHINE.
No. 581,066. Patented Apr. 20, 1897.
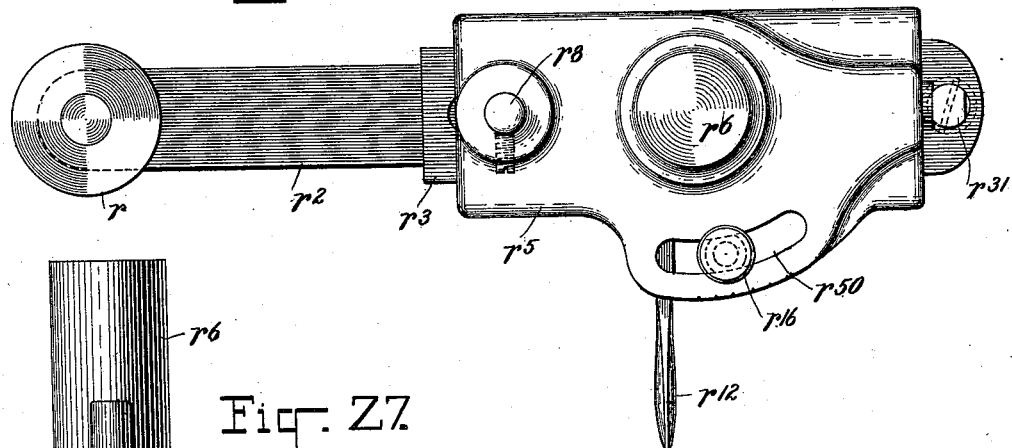
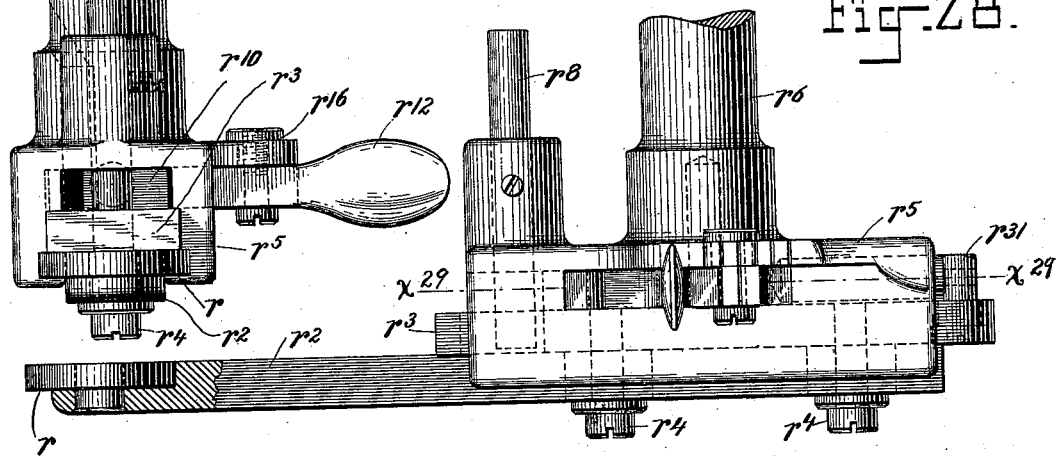
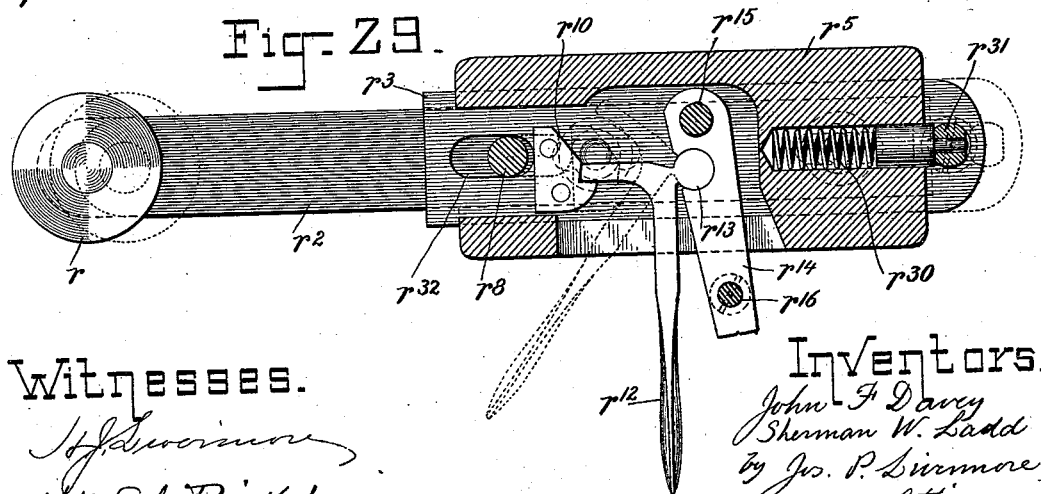

UNITED STATES PATENT OFFICE.

JOHN F. DAVEY AND SHERMAN W. LADD, OF BEVERLY, MASSACHUSETTS, ASSIGNORS TO THE DAVEY PEGGING MACHINE COMPANY, OF PORTLAND, MAINE.

PEGGING-MACHINE.

SPECIFICATION forming part of Letters Patent No. 581,066, dated April 20, 1897.

Application filed December 14, 1896. Serial No. 615,615. (No model.)

*To all whom it may concern:*

Be it known that we, JOHN F. DAVEY and SHERMAN W. LADD, of Beverly, county of Essex, and State of Massachusetts, have invented an Improvement in Pegging-Machines, of which the following description, in connection with the accompanying drawings, is a specification, like letters on the drawings representing like parts.

This invention relates to a pegging-machine for pegging boots and shoes, and is shown as embodied in a machine for pegging on a horn after the last is drawn from the boot or shoe to be pegged, although portions of the invention are applicable to machines for pegging a boot or shoe while on the last.

In the machine herein shown embodying this invention means are provided for cutting off the projecting ends of the pegs inside the sole as the said pegs are driven; and the invention consists in part in novel features of construction and arrangement of the horn-tip or work support and connecting mechanism therein, whereby the cutting operation is performed neatly and efficiently; and the invention further consists in novel feed mechanism for feeding the stock and in the combination thereof with said work-support.

The invention further consists in a stock-gage of novel construction and in novel features of construction of the main framework or support of the machine in conjunction with suitable construction of the working parts thereof whereby the head or working portion of the machine may be set at different heights or adjusted to the convenience of any given operator.

The invention further consists in various details of construction that will be hereinafter pointed out.

The machine herein shown as illustrating the invention is adapted for operating with wooden pegs and is herein so described, but it is obvious that the invention or portions thereof are equally applicable to machines for operating with fastenings of metal or other suitable material, and the invention is therefore not limited to a machine for operating with wooden pegs, and the term "peg" is intended to include any fastening capable of being operated upon by the instrumentalities hereinafter described, or any of them, and the term "pegging-machine" is intended to include a machine for operating upon any kind of fastening that can be used in connection with the essential operative elements of the machine.

Figure 6:
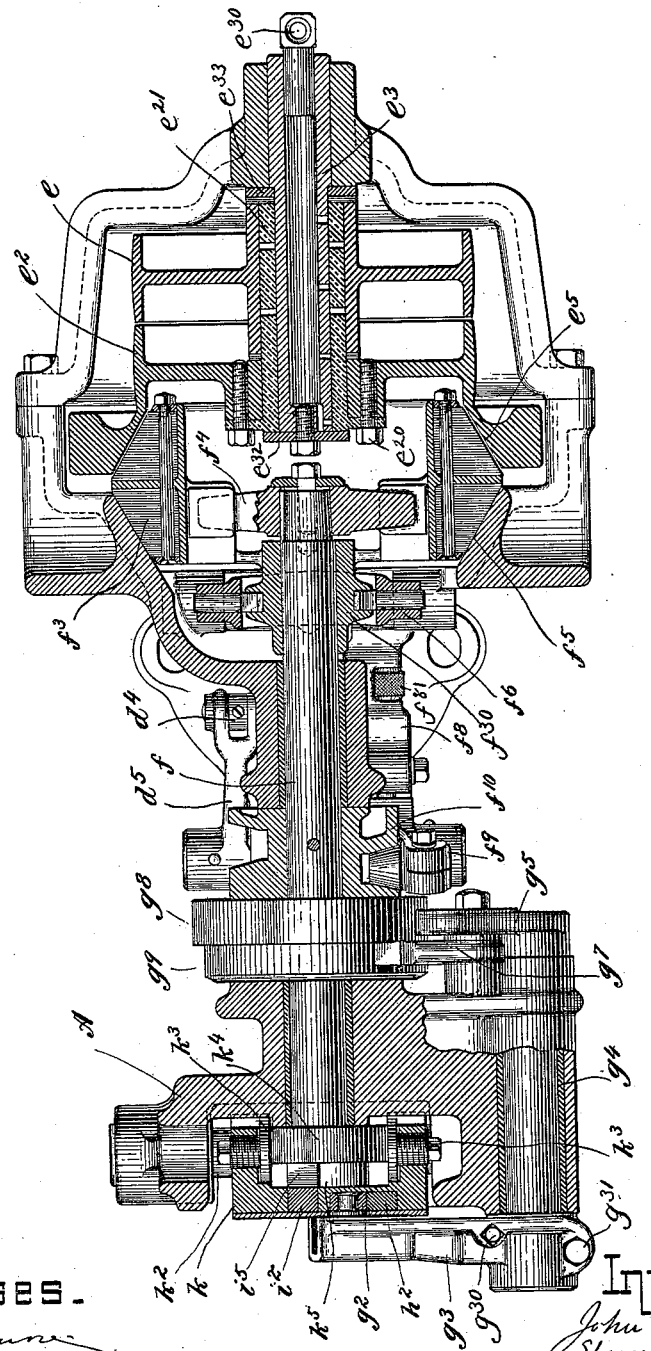
Figure 13:
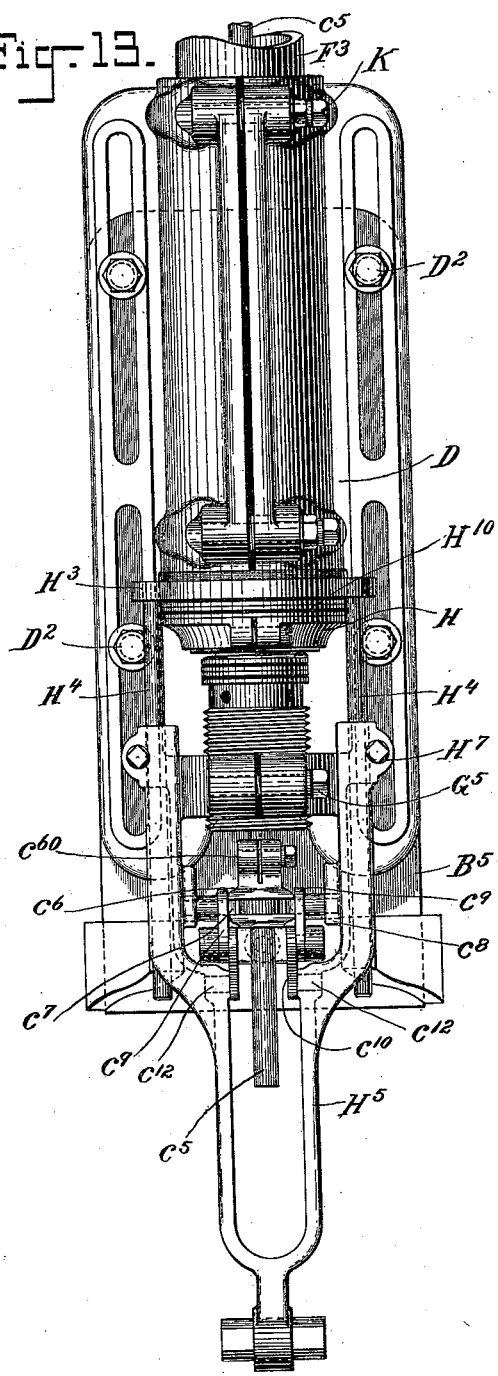
Figure 14:
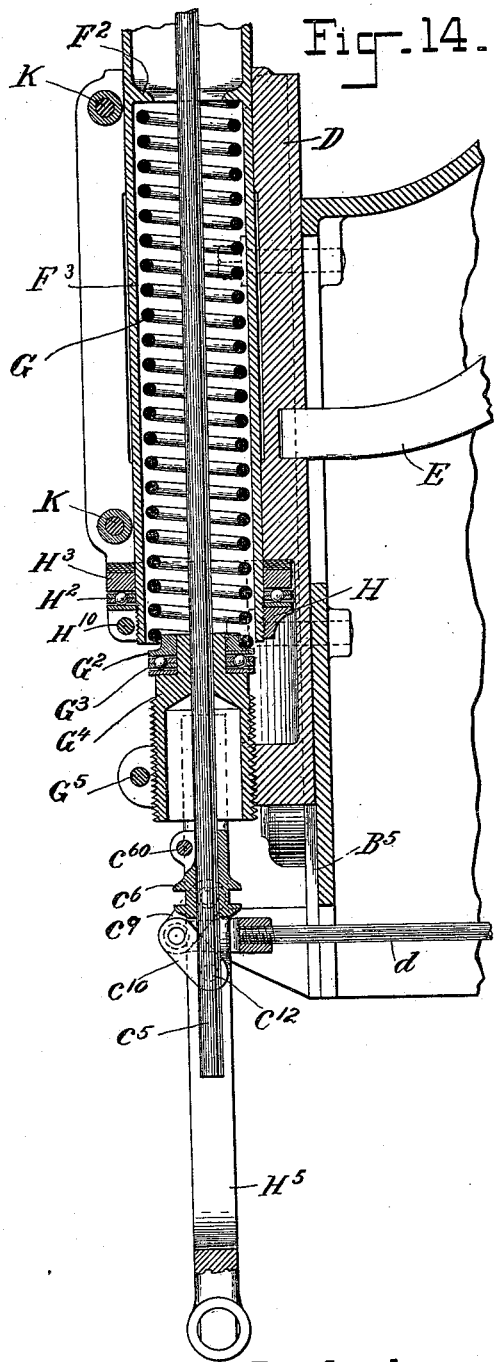

Figure 1 is a side elevation of the head or upper portion of the machine, comprising the main shaft and main operative mechanism for feeding the stock and driving the pegs; Fig. 2, a sectional detail thereof on line $x^2$; Fig. 3, a side elevation, partly in section, of the base or stand of the machine and the horn or work support; Fig. 4, a cross-section on line $x^4$ of Fig. 3; Fig. 5, a front elevation of the head of the machine, showing also the upper portion of the horn and supporting-column; Fig. 6, a longitudinal sectional plan of the head of the machine; Fig. 7, a longitudinal sectional detail showing the clutch-and-stop mechanism; Fig. 8, an end elevation of a portion thereof; Fig. 9, a detail showing portions of said clutch-and-stop mechanism detached; Fig. 10, a detail showing in perspective portions of the awl operating and feeding mechanism; Fig. 11, a sectional detail of the carrier for the awl and driver-bars, showing the feed and driver bar actuating cam in front elevation; Fig. 12, a sectional elevation of a portion of the devices shown in Fig. 10; Fig. 13, a front elevation of the horn-support and mechanism coöperating with the horn; Fig. 14, a central longitudinal section thereof on a plane at right angles to the plane of elevation of Fig. 13; Fig. 15, a longitudinal section of the horn, showing a portion of the cutter-actuating mechanism therein; Fig. 16, a horizontal sectional plan on line $x^{16}$ of Fig. 15; Fig. 17, a plan of the horn-tip or work support; Fig. 18, an elevation showing the lower side of the horn-tip; Fig. 19, a longitudinal section thereof; Fig. 20, a transverse section thereof on line $x^{20}$ of Fig. 19; Figs. 21 and 22, a longitudinal section and an elevation showing the lower side of the horn-tip and a modified construction of the cutter mechanism therein; Fig. 23, a sectional plan on line $x^{23}$, Fig. 1, showing the peg-wood-feeding mechanism; Fig. 24, a rear elevation of a portion thereof; Fig. 25, a horizontal section on line $x^{25}$, Fig.

24; Fig. 26, a plan of the edge gage for the stock; Fig. 27, a front elevation thereof; Fig. 28, a side elevation thereof; and Fig. 29, a sectional plan on line $x^{29}$, Fig. 28.

The main framework A of the head portion of the machine, containing the awl and driver and actuating mechanism therefor, is supported on the upper end of a two-part column or base, the main portion B of which constitutes the base proper of the machine and is provided with an upward extension $B^2$, in which the head-supporting portion $B^3$ is contained, said portion $B^3$ being vertically adjustable in its socket or bearing $B^2$ in the base portion of the column and resting upon an adjusting-screw C, (see Fig. 3,) working in a suitably-threaded bracket or bridge portion $B^4$ of said base B. Said base B is also provided with a vertical bed or guideway $B^5$, (see also Figs. 13 and 14,) upon which is secured the horn-support D, said horn-support being capable of vertical adjustment on the said bed $B^5$ and being securely fastened, when properly adjusted, by means of bolts $D^2$, which pass through slots in said horn-support D to provide for said vertical adjustment, as best shown in Fig. 13.

The lower part of the head-supporting column $B^3$ is provided with an arm or projection E, which engages with the horn-support D, (see Figs. 3 and 4,) and thus maintains the said horn-support at the proper height with relation to the head of the machine when properly positioned in the base B. The upper portion of the socket $B^2$ for the column $B^3$ is longitudinally split, as indicated at $B^{20}$, Fig. 3, and provided with clamping-bolts $B^{21}$, by which the column $B^3$ may be rigidly fastened when set at the proper height. By these means the working parts of the machine which require the especial attention of the operator may be set at the height most convenient for a given operator, and if it is necessary at any time to change or readjust the height this can be done by loosening the clamping-bolts $B^{21}$ $D^2$ and then turning the screw C up or down until the desired height is reached, the corresponding adjustment being made in the connections between the working parts in the head and horn and in the base portion B, which connections are constructed to provide for such adjustment as will be hereinafter described. When the machine is set to the desired height, the bolts $B^{20}$ $D^2$ are again tightened. The lower portion $B^{30}$ of said column $B^3$ is flattened, as shown in Figs. 3 and 4, and engaged by adjusting-screws $B^{31}$, by which the column $B^3$ may be adjusted angularly to bring the driving mechanism to the proper position with relation to the horn or work support.

In order to provide for the accurate adjustment of the working devices of the head with relation to the tip of the horn, the frame A of the head is adjustably supported upon the upper end of the column $B^3$, being retained in alinement therewith by a tenon or projection $A^{15}$ (see Figs. 1 and 5) entering a corresponding groove in the upper end of the column, said tenon having a notch $A^{16}$, (see Fig. 1,) which is engaged by a collar $A^{17}$ on an adjusting-screw $A^{18}$ (see Fig. 3) in the upper end of the column, whereby the head may be moved backward and forward on the top of the column until the plane of the awl and driver are brought into exact coincidence with the axis of the horn, after which the head is securely fastened by the bolts $A^{19}$, (see Fig. 5,) which pass through elongated openings in the base-flange of the head-frame to admit of the said adjustment.

The horn F is supported to rotate freely and be longitudinally movable in the horn-support D and is normally pressed upward by a spring G, (see Fig. 14,) the upper end of which engages with a shoulder $F^2$ inside of the shank portion $F^3$ of the horn, while the lower end of said spring rests upon a collar $G^2$, engaging through an antifriction device $G^3$ with a shoulder upon a foot-piece $G^4$, adjustable vertically in the horn-support D to thereby adjust the tension of the spring. The said foot-piece or spring-support is externally threaded and engaged with a correspondingly-threaded socket in the horn-support to provide for the vertical adjustment, the said socket being split and provided with a clamping-screw $G^5$, as shown in Figs. 13 and 14, to lock said spring-support when properly adjusted. The upward movement of the horn by the spring G is limited by a shoulder or collar H, secured to the lower end of the horn-shaft and resting through the intervention of an antifriction device $H^2$ against a collar or ring $H^3$, which itself rests against the lower end of the portion of the horn-support in which the shank of the horn is rotatably mounted, there being preferably a yielding washer or cushion interposed between said ring $H^3$ and said bearing portion.

The collar H is connected with the horn-shank by a screw-thread, so as to be vertically adjustable thereon to adjust the height to which the horn may rise when no material is supported thereon, said collar or ring H being divided transversely and provided with a clamping-screw $H^{10}$ to hold it securely when properly adjusted.

The ring $H^3$ is connected by rods $H^4$ (see Fig. 13) with a forked link $H^5$, connected with a treadle or foot-lever $H^6$, (see Fig. 3,) by which the horn may be depressed against the stress of the spring, as required in applying the shoe thereto or removing it therefrom.

The connection $H^7$ between the rods $H^4$ and link $H^5$ provides for adjustment in the connection between the treadle and the horn, as is necessary when the horn-support is adjusted vertically on the base of the machine, as has been before described.

The antifriction-bearings $G^3$ $H^2$ enable the horn to turn easily in its socket, although subjected to considerable pressure by the spring. The socket or bearing proper for the shank of the horn is split longitudinally and provided with bolts K, by which it may be adjusted to take up wear in order that the horn-shank may be held firmly in upright position while capable of rotating freely, it being essential to the perfect operation of the machine that the tip or upper end of the horn work or support proper should remain always accurately located with reference to the pegging mechanism proper or awl and driver which operate upon the stock from above.

It is necessary for the good work that the insole should be supported close to the point at which the awl and peg penetrate, as otherwise the material of the insole will be depressed around the peg, rendering the inner surface of the shoe uneven and also precluding a close and compact union between the outsole, upper, and insole, such as is necessary for good work. In order to insure such support for the insole at the point where it is penetrated by the awl and peg, the horn-tip which contains the cutting devices, which will be hereinafter described, is provided with a supporting-top, herein shown as a cap or cover $a$, (see Figs. 17 and 20,) provided with a central opening or perforation $a^2$ concentric with the axis of rotation of the horn and of sufficient size to receive the protruding end of the awl or peg when substantially in line with the axis of rotation of the horn. The said top or cover $a$ for the upper end of the horn is preferably a detachable piece and is thin at the sides of the opening, so that the cutting-jaws $b$, which work close to its under surface, may cut off the protruding end of the peg close to the surface of the insole, thus leaving the said surface of the insole sufficiently smooth along the line on which the pegs are driven.

The peg-cutting device as herein shown is composed of a pair of cutters $b$, operating like the well-known cutting pliers or nippers, the jaws in the construction shown in Figs. 18 to 20 being pivoted on a stud or pivot-piece $b^2$, secured in the horn-tip and acted upon by springs $b^3$, (see Fig. 18,) which tend to hold the cutting-jaws separated. The cutting-jaw levers are provided with cam-surfaces $b^4$, which receive between them a cam or wedge $b^5$ capable of longitudinal movement in the horn-tip, which cam when moved upward or toward the pivot of the cutter-jaws separates the lower ends of the cutter-levers and thus closes together the upper ends thereof carrying the cutters, which thus nip off the protruding end of the peg between them at the under surface of the horn-cap $a$.

It is not essential so far as the other features of the invention are concerned or so far as the cutting device enters as an element in combination with other elements of novelty in the machine that the cutters should be constructed and operated as has just been described, and in Figs. 21 and 22 a modification is shown in which the cutting-jaws $b^{10}$ instead of being pivoted in the horn-tip are movable bodily in the horn-tip, being closed by a movement of the operating shank or spindle $b^{60}$ toward the end of the horn-tip and opened by a movement of said shank in the opposite direction. In this construction the cutter-blades $b^{10}$ have their outer upper ends curved and engaged with a correspondingly-curved surface in the horn-tip, so that as the blades are moved upward or toward the end of the horn their cutting edges are crowded together by the cam or wedge action of the said engaging surfaces. The end of the spindle $b^{60}$ is recessed to receive the shanks of the cutter-blades which are provided with projections $b^{20}$, confined between projections $b^{21}$ $b^{22}$ of a plate $b^{23}$, secured, as by a screw $b^{24}$, to the upper end of the spindle $b^{60}$, which is properly recessed, as shown, to receive the said plate and the ends of the cutter-blade shanks. A plate $b^{25}$, fastened, as by a screw $b^{26}$, to the horn-tip, further serves to confine the cutter-blades in working position in the horn-tip, affording sufficient freedom for the up-and-down movement of the cutter-blades by the spindle $b^{60}$ and the closing together and separation of the cutting edge by a rocking movement of the cutter-shanks produced by such up-and-down movement.

Referring to the plane through the axis of the horn-shank and through the part of the horn laterally projecting therefrom as "the plane of the horn," the pair of cutting-jaws operate in a direction at right angles to the plane of the horn, each jaw moving toward and from the axis and the two jaws meeting at the axis of the horn when the peg is finally severed. This construction is of importance, since a pair of cutting-jaws operating in this manner produce equal pressure on opposite sides of the peg-tip being cut and consequently sever said peg-tip without any tendency to shift the position of the shoe or to break the peg itself, as is the case when a cutter operates from one side only of the peg.

The cutting-jaws are supported in a tip $F^4$, made in a separate piece from the main portion of the horn F, and having a shank $F^5$, which is secured in a socket in the main portion of the horn. Thus the horn-tip and cutters contained therein may be conveniently removed and replaced by another if there is any occasion to do so, and in the construction shown in Figs. 18 and 19 there is no connection between the cutters and their actuating-spindle $b^6$ which requires any attention when such exchange of horn-tips is made.

It is essential that the cutting device should be operated at the proper time at each complete operation of the peg-driving mechanism, so as to cut off the protruding end of the peg after it is driven by the descent of the driver and before the feed of the material takes place preparatory to the driving of the next peg. Such operation of the cutting device is provided for by connections through the horn and column or base of the machine to the peg-driving mechanism in the head of the machine, such connections being properly constructed to provide for the free and complete rotation of the horn upon its axis in the horn-support B and also for the adjustment of the height of the working parts of the machine with relation to the base or column B before referred to and being as follows: The cutting edges, as before stated, are closed and permitted to open by the longitudinal reciprocation of the shank or spindle $b^6$ (see Figs. 15 and 18) or $b^{60}$, Figs. 21 and 22, longitudinally movable in the shank portion $F^5$ of the tip $F^4$ of the horn. The said rod $b^6$ (or $b^{60}$) is reciprocated longitudinally at the proper time during each cycle of movements of the peg-driving mechanism by means of a connecting-rod $c$, (see Fig. 15,) connected with an arm $c^{21}$ (see Figs. 15 and 16) from the rock-shaft $c^3$ in the lateral arm $F^6$, which connects the horn proper with its shank or bearing portion $F^3$, said rock-shaft being provided with a second arm $c^4$, connected with a rod $c^5$, extending through the shank portion of the horn and having fixed thereon near its lower end a grooved collar or hub $c^6$, (see Figs. 13 and 14,) into the groove of which project studs $c^7$, guided in grooves $c^8$ in the horn-depressing link $H^5$, before mentioned, and connected with links $c^{10}$, themselves pivoted at $c^{12}$ in the said horn-depressing link $H^5$. The said links $c^9$ $c^{10}$ thus constitute a toggle-lever connection between the horn-depressing link $H^5$ (which accompanies the horn in its vertical movement and thus remains in fixed relation to the horn, whatever may be its height, dependent upon the thickness of the stock in the operation of the machine) and the cutter-actuating rod $c^5$, which, owing to the engagement therewith of the studs $c^7$ through the intervention of the grooved collar $c^6$, permits of the swiveling movement of the horn without interfering with the longitudinal movement of said rod $c^5$ by the said toggle-lever $c^9$ $c^{10}$.

The collar $c^6$ is adjustable upon the rod $c^5$ and is secured thereto, when properly adjusted, by a clamp $c^{60}$, thus providing for the adjustability of the height of the horn containing the cutter and actuating mechanism therefrom to and including said rod $c^5$ with relation to the base of the machine and the link or stirrup $H^5$ and treadle mechanism therefor supported on said base.

The toggle-lever $c^9$ $c^{10}$ is straightened to close the cutting-jaws and is bent or broken to open the said cutting-jaws by means of a link or connecting-rod $d$, (best shown in Fig. 3,) connected with one arm of an elbow-lever $d^2$, pivoted at $d^3$ in the base B, and having its other arm connected by a rod or link $d^4$ with actuating mechanism in the head of the machine, by which said rod $d^4$ is reciprocated longitudinally at each rotation of the main shaft of the peg-driving mechanism, or, in other words, at each cycle of operations of the pegging-machine, by which the material is fed, prepared to receive a peg, and the peg driven. The said link or connecting-rod $d^4$ is provided with a slip-joint connection and clamp, as indicated at $d^{50}$, Fig. 3, to provide for adjustment of the length between its upper connection with the working parts of the peg-driving mechanism proper and its point of connection with the lever $d^2$ in the base B of the machine when the height of the working mechanism is changed with relation to the base, as before described.

The connecting mechanism for operating the cutting devices in the horn is so constructed and arranged as not to interfere with the complete rotation of the horn, so that the latter may be manipulated with perfect freedom and may be turned as far as need be by the operator of the machine, it being commonly desirable, if not necessary, to turn the horn completely around during the presentation of each shoe to the pegging devices.

It is obvious that the apparatus thus far described might be employed in connection with peg-driving or nailing mechanism of various kinds and that the invention embodied in the parts of the machine thus far described is not limited to its embodiment in conjunction with any specific form of peg-driving mechanism except in so far as the latter embodies novel features of construction and operation which adapt it especially to coöperate with the material-supporting and peg-cutting mechanism thus far described.

The stock-feeding and peg-driving mechanism, which will now be described, embodies novel features of construction and mode of operation which are of special advantage in conjunction with the work-supporting and peg-cutting devices thus far described, but some of which are also useful in connection with other forms of work-supporting mechanism either with or without means for cutting off the protruding ends of the pegs when driven.

As before stated, it is essential for good work that the material should be supported by the anvil or work-support closely around the point at which the awl penetrates and the peg is driven. This precludes the adoption of the awl-feed as heretofore commonly employed in pegging-machines, in which the awl is rigidly secured in the awl-stock and penetrates to its full depth, so that the awl-stock bears upon the outsole and depresses it below the presser-foot or upper work-clamp of the machine before the lateral movement of the awl to feed the material takes place.

In accordance with the present invention, the awl, instead of being fixed in an awl-bar the end of which descends into engagement with the outsole, is longitudinally movable in a nose or awl-guide, and means are provided for giving the awl and nose independent movement toward and from the sole in conjunction with the necessary lateral movement for the awl-feed, these parts being so constructed and operated that the awl is not entered into the material far enough to penetrate or pass below the lower surface of the material at its thinnest point at the time when the awl-guide is depressed and the lateral feed movement takes place. When the awl is thus entered in, but not passed wholly through, the material, the awl-guide or nose descends so as to bear upon the outsole, depress it below the presser-foot or upper work-clamp member, and thus free it from the hold between the said presser-foot and the horn below, after which both the awl and its guide move laterally, feeding the material to the point at which the awl is directly over the axis of the horn.

It is essential that the awl should penetrate wholly through the material in order to enable the peg to be properly driven, and an additional downward longitudinal movement of the awl must be had either before or after the feed movement takes place, during which feed movement the awl, as before stated, does not pass wholly through the material, and consequently does not collide with the horn.

It is preferable that the complete descent of the awl to penetrate the material should take place after the feed movement is completed, at which time the awl is directly over the perforation $a^2$ in the horn-tip, as with such mode of operation the radius of the supporting end of the horn-tip may be greater than the length of feed movement, and, as herein shown, the awl is caused to have a further longitudinal downward movement after the lateral movement is completed and when the awl is directly over the axis of the horn, after which both the awl and awl-guide are raised, leaving the material clamped between the horn and presser-foot, and are moved laterally back to their original position, in which movement the peg and driver are brought over the awl-hole and the peg is then driven at the point directly over the axis of the horn, so that its protruding end may be cut by the cutting device in the horn previously described.

As herein shown, the above-mentioned elements are constructed for operation and are operated, as above described, by the following mechanism, (best shown in Figs. 1 to 12, inclusive:) The machine is provided with a loose belt-pulley $e$, Figs. 1, 6, and 7, and a driving-pulley $e^2$, both adapted to turn freely upon a bearing support or spindle $e^3$ in line with the main actuating-shaft $f$ of the machine. The said driving-pulley $e^2$ is connected with the shaft $f$ by a clutch-and-stop mechanism of novel construction. (Best shown in Fig. 1 and Figs. 6 to 9, inclusive.) The said clutch mechanism is not herein claimed, but forms the subject of our application, Serial No. 630,061, filed March 31, 1897. For the purpose of fully disclosing the best embodiment of our present invention known to us said clutch mechanism and its relation to the main elements of the pegging mechanism are briefly described as follows:

Said clutch comprises a friction member $f^3$, itself loose and longitudinally movable on the main shaft $f$, but engaged with a cross-head $f^4$ thereon, so as to rotate said main shaft when it is itself rotated by the pulley $e^2$. The said clutch member $f^3$ has a friction-surface adapted to engage with a socket $f^5$ in the frame to act as a brake to stop its rotation and that of the main shaft when disengaged from a similar friction-surface $e^5$ on the driving-pulley $e^2$. Said clutch is moved into engagement with the driving-pulley or with the friction-brake by a shifting-lever $f^6$, pivoted at $f^{60}$ upon the main frame and engaged at its upper end with a grooved hub $f^{30}$ on the shiftable clutch member $f^3$, its lower end being acted upon at one side by a spring-pressed plunger $f^7$, tending to force the clutch member into engagement with the driving-pulley, so as to set the machine in operation, and acted upon at the proper time in opposition to said spring connection by a trip or trigger $f^8$, pivotally connected with the lower end of said shifting-lever $f^6$, which trip when in its upper position is engaged with a stopping-lever $f^9$, operated by a cam $f^{10}$ on the main shaft $f$, which cam at each rotation of the main shaft moves the lever $f^9$, so that if the trip $f^8$ is engaged therewith the clutch member $f^3$ will thereby be disengaged from the pulley $e^2$ and stopped by engagement with the brake $f^5$. Engagement of the trip $f^8$ with the lever $f^9$ is controlled by a treadle $f^{12}$, (see Fig. 3,) connected with said trip by a rod or link $f^{13}$, provided with a slip-joint at $f^{14}$ (see Fig. 3) for adjustment when the head of the machine is raised or lowered, as before described. When the treadle $f^{12}$ is depressed, the trip $f^8$ is disengaged from the lever $f^9$ and the clutch is thrown into engagement by the spring $f^{70}$ of the plunger $f^7$, and the machine runs continuously, but when the said treadle $f^{12}$ is released the trip $f^8$ tends to move upward and at the proper time in the vibration of the lever $f^9$ slips past and into engagement therewith, as shown in Fig. 1, so that when the lever is vibrated in the proper direction by the cam $f^{10}$ the clutch will be disengaged and the main shaft stopped at a definite point dependent upon the position of the cam $f^{10}$ on said main shaft. The trip-arm $f^8$ and stop-lever $f^9$ are provided with suitably-hardened engaging fingers $f^{30}$, clamped in sockets in said levers, and said projection $f^{80}$ in the trip-arm is provided with a threaded shank or stem (see Fig. 9) coöperating with a nut $f^{81}$ in a recess in said trip-arm, whereby the end of the projection $f^{80}$ may be properly adjusted to cause the clutch member $f^3$ to engage properly with the brake $f^5$. The machine is thus stopped when the awl and awl-guide are disengaged from the outsole, thus leaving the shoe free to be withdrawn from the machine and the machine in proper condition to receive the next shoe and to begin operation thereon when the clutch is again engaged by depression of the treadle $f^{12}$.

The bearing-support $e^3$ for the fast and loose pulleys $e^2$ $e$ is shown as a dead or nonrotating spindle, and the driving-pulley $e^2$ is secured by screws $e^{20}$ (see Fig. 6) to a sleeve $e^{21}$, which furnishes the bearing for the loose pulley $e$. Thus a long bearing-surface is afforded for both pulleys. The spindle $e^3$ is hollow and is provided with an oil-inlet duct $e^{30}$, and suitable perforations are made in said spindle and in the sleeve $e^{21}$ to distribute the oil over the internal and external bearing-surfaces of the sleeve, which is confined from longitudinal movement on the spindle $e^3$ by a collar $e^{32}$, fastened to the inner end of the spindle, as shown. The other end of the sleeve $e^{21}$ and of the hub of the loose pulley $e$ is engaged by a washer $e^{33}$, resting against a shoulder on the spindle $e^3$, as shown in Figs. 6 and 7, and the said spindle is held fast in a suitable bearing-socket $A^{20}$ in the main framework of the head, said socket being split and provided with a clamping-bolt $A^{31}$ (see Figs. 1 and 7) to hold the said spindle firmly.

The spindle may be adjusted longitudinally in its bearing-socket to bring the driving-pulley in proper proximity to the clutch member $f^3$, a screw $e^{34}$ having a collar engaging with the end of the spindle, as shown in Fig. 7, serving to facilitate said adjustment.

By having the pulleys run on a shaft or bearing independent of the main driven shaft the momentum of the moving parts when disengaged from the driving-pulley is reduced to a minimum.

The awl, awl-guide, and peg-driver receive the proper movement from the main shaft through suitable cams thereon, as will be described. The awl $g$ (see Fig. 5) is fastened in an awl-bar $g^2$ and works through a nose or awl-guide $h$, secured to a slide-bar $h^2$, the said bars $g^2$ and $h^2$, as well as the driver-bar $i^3$ of the driver $i$, being longitudinally movable in a carrier $k$, and capable of lateral or transverse movement in the main frame A of the head of the machine, said carrier $k$ being provided with guide-rods $k^2$, working in suitable guideways in said frame, as clearly shown in Figs. 1 and 5.

The carrier $k$ is slotted or recessed at its rear, as best shown in Fig. 6, and provided with bearing-pieces $k^3$, preferably adjustable, as shown, (see also Fig. 11,) coöperating with a cam $k^4$ at the end of the main shaft $f$, which gives the desired lateral or feed movement to the carrier $k$ and awl, awl-guide, and driver-bars working therein.

By having the cam $k^4$ operate positively on the carrier $k$ to move the same in both directions and having the guides $k^2$ of said carrier substantially in the plane of action of said cam, as shown in Fig. 6, a very rapid and easy running of the machine is attained.

The cam $k^4$, as clearly shown in Fig. 11, has two portions concentric with its axis of rotation but at different distances therefrom, the difference in radius of the two portions being equal to the length of feed movement desired, and said concentric portions are connected by curves, such that the width between the tangent faces of the bearing-pieces $k^3$ is constant in all positions of the cam, which thus engages positively at all times with both of the said bearing-pieces, rendering the movement of the carrier positive and uniform without concussion.

If it is desired to change the length of feed of the machine, the cam $k^4$ is removed and another of the same character, but with the difference between the radii of its concentric portions equal to the new length of feed desired, is substituted, the bearing-pieces $k^3$ being readjusted, if necessary, to contact with both sides of the cam.

When the feed is changed, the position of the head of the machine is readjusted, if necessary, to bring the awl over the axis of the horn at the end of the feed movement, this being effected by the angular adjustment of the column $B^3$ by the screws $B^{31}$, Fig. 4, above referred to, said angular adjustment of the column affording a corresponding lateral adjustment of the end of the machine-head containing the awl and driver in the direction of the feed movement. This lateral adjustment of the portion of the machine-head containing the awl and driver, in conjunction with the longitudinal adjustment of the machine-head on the column by the device $A^{17}$, Fig. 3, before described, enables the elements of the pegging mechanism that act directly upon the material being pegged to be adjusted accurately with relation to the horn, as is necessary for good work.

The driver-bar $i^2$ is provided with a lug or projection $i^5$, engaged by a projection $k^5$ on the cam $k^4$, which operates to raise the driver at a definite time in each rotation of the main shaft and then to release the same, permitting it to be driven by an arm $i^6$, actuated by a spring $i^7$, contained in a spring barrel or holder $i^8$, said arm $i^6$ acting on the upper end of the driver-bar through the intervention of a connecting-rod $i^9$, engaged with said spring-arm and driver-bar by a ball-and-socket or universal joint to accommodate the various movements thereof, while retaining the driver-bar under downward spring-pressure, so that it is thrown downward when released by the projection $k^5$, when it arrives at the position shown in Fig. 11.

The construction of the spring and its connection with the arm $i^6$ is best shown in Fig. 2. The said spring $i^7$ is a spiral spring having the ends thereof bent into line with its axis, as shown at $i^{70}$ $i^{71}$, and preferably squared or otherwise adapted to be held securely against rotary movement.

The spring-barrels $i^8$ and the bearings for the driver-actuating arm $i^6$ are supported in a bracket $A^{10}$, extending from the frame A of the head of the machine and forked at its upper end to afford two annular supports $A^{12}$ for the spring-barrels $i^8$. Within the openings of said supports are bushings $i^{12}$, which form the bearings in which the hub of the driver-arm $i^6$ is supported, said bushings being provided at their outer ends with flanges, by which they are clamped in position by the spring-barrels $i^8$, which are secured by bolts $i^{13}$ to the bearing-supports $A^{12}$. The squared ends $i^{71}$ of the springs $i^7$ are fitted in a correspondingly-shaped socket in the axis of the hammer-arm $i^6$ and are securely held therein by bolts $i^{72}$, while the outer ends $i^{70}$ of said springs are similarly held in the ends of the spring-barrels $i^8$, so that said springs act torsionally upon the arm $i^6$, tending to force the same downward.

The bolts $i^{13}$, by which the spring-barrels are fastened to the supports $A^{12}$, pass through curved slots in said spring-barrels, as clearly shown in Fig. 1, so that the latter may be adjusted axially with relation to the said supports $A^{12}$ before being fixedly held with relation thereto by the bolts $i^{13}$, thus enabling the tension of the springs to be varied.

The springs $i^7$ and the corresponding parts at the two sides of the support $A^{10}$ are merely duplicates of one another, and a single spring similarly constructed at one side only of the driver-arm might be used, although the construction shown is preferable, as being more compact and symmetrical.

The awl-bar $g^2$ is operated in its up-and-down movement by an arm or lever $g^3$, having a slotted end coöperating with a pin or projection from said awl-bar, as shown in Figs. 5 and 10, said arm being fixed to one end of a rock-shaft $g^4$, the other end of which is provided with an arm $g^5$, (see Figs. 10 and 12,) operated by a slide $g^6$, forked or slotted to embrace the main shaft $f$, as shown in Fig. 12, and provided with a cam-roller $g^7$, engaging with the cam-groove in the cam $g^8$ on the main shaft.

The arm $g^3$ is angularly adjustable on the rock-shaft $g^4$, which is provided with a radial pin or projection $g^{40}$, keyed therein and engaged by set-screws $g^{30}$ in the arm $g^3$, which is split and provided with a clamping-bolt $g^{31}$ to fasten it securely on the rock-shaft when set at the proper angular position with relation thereto. (See Fig. 5.) This construction enables the point of the awl to be set at the proper height to properly enter, penetrate, and be wholly withdrawn from the material under the action of its cam $g^8$.

The arm $g^5$ is longitudinally slotted and the connecting-joint between the same and the slide $g^7$ is adjustable in said slot toward and from the rock-shaft $g^4$, to thus vary the throw or longitudinal movement of the awl, as may be desired.

The slide $g^7$ works in a guide in a cap $g^9$, loose on the main shaft and covering the grooved face of the cam $g^8$, as best shown in Figs. 6 and 10. The groove of the cam $g^8$ that operates the awl-bar is constructed with a double throw, as shown in Fig. 12, in which the roller $g^7$ is in the part of the groove that retains the awl at its highest position or wholly withdrawn from the material, said groove having a portion $g^{80}$, which operates to depress the awl a certain distance, and is followed by a portion $g^{81}$, which causes the awl to dwell in its partially-depressed position, (at which time the lateral feed movement of the carrier $k$ takes place,) followed by a portion $g^{82}$, which causes the complete descent of the awl to take place, by which it wholly passes through the thickest part of the material at any time operated upon.

The awl-guide $h$ has a vertical movement by which its lower end is raised above and depressed below the level of the presser-foot P, the said depression taking place before the beginning of the feed movement and causing the horn to yield downward against the stress of its spring G, so as to free the sole from the presser-foot P and enable it to be fed along the top of the horn by the lateral feed movement of the awl and its guide effected by the carrier $k$, as before described. This up-and-down movement of the awl-guide $h$, which is independent of the up-and-down movement of the awl itself, is produced by a lever $h^3$, pivoted at $h^4$ on the framework and having one arm engaged with the upper end of the awl guide-bar $h^2$ and its other arm provided with a cam-roller $h^5$, adjustably secured thereto, as shown in Figs. 10 and 12, and coöperating with the periphery of the cam $g^8$, which, as shown in Fig. 12, depresses the said awl-bar guide at about the time when the awl receives its preliminary downward movement and retains it depressed until the awl has completed its downward movement, after which the awl and its guide are both raised to their highest position, thus withdrawing both from the sole, which is then forced up by the horn against the presser-foot P and clamped firmly between the horn and presser-foot, while the carrier $k$ makes its return movement which brings the peg and driver over the awl-hole just before the driver is released by the projection $k^5$ and caused to drive the peg. The awl-guide is lifted by the spring $h^{20}$. (See Fig. 5.)

The cutter-actuating mechanism for the peg-tip cutter in the horn is operated at the proper time—that is, just after the peg is driven by an arm $d^5$, (see Fig. 9,) connected with the upper end of the connecting-rod $d^4$, before mentioned. Said arm $d^5$ is connected with the fulcrum-shaft $f^{12}$ of the clutch-operating lever $f^9$, and thus operated by the cam $f^{10}$, before mentioned, which operates to disengage the clutch, the effective movement of the cutter thus taking place just before the point at which the machine stops when thrown out of operation.

The peg-wood $p$ (see Figs. 23 to 25) is fed by novel means, comprising a peg-wood guide $t$, rigidly secured to the laterally-moving carrier $k$ for the awl and driver-bar at the rear thereof, as best shown in Fig. 25.

The peg-wood feed-roll $t^2$ is journaled in said guide and is provided with a ribbed surface to engage one side of the strip, which is acted upon at the opposite side by a correspondingly-ribbed presser-roll $t^3$, mounted in a bearing-piece capable of longitudinal movement in a socket $t^{30}$ in the peg-guide and acted upon by a spring $t^{31}$ to press the roll against the peg-wood, the shank of the bearing-piece of the roll $t^3$ being provided with a stop, shown as a nut $t^{32}$ and lock-nut $t^{33}$, (see Fig. 23,) to limit its movement under the action of its spring.

The feed-roll $t^2$ is provided with a ratchet $t^4$, the teeth of which are properly spaced to advance the peg-wood enough for one peg as the ratchet is advanced one tooth, such ratchet being detachable and secured to the feed-roll by a screw $t^{40}$, so that it can be exchanged for one with longer or shorter teeth when the peg-wood feed is to be varied. The ratchet is advanced one tooth at each to-and-fro vibration of the carrier $k$ of the awl and driver by means of a pawl $t^5$, pivoted at $t^{50}$ in a slide $t^{51}$, movable in a guide-passage $t^{52}$, secured in the frame of the machine, said slide being acted upon by a spring $t^{53}$, as best shown in Fig. 23, tending to keep its pawl-carrying end in engagement with the end of the guide $t^{52}$, as shown in Fig. 23.

The rotation of the peg-wood-feed roll takes place in the latter part of the return movement of the carrier $k$ after it has moved to feed the stock and is returning to bring the driver over the awl-hole, the peg-wood being fed forward just as the driver comes into position over the awl-hole immediately before the driver descends to drive the peg, the parts then being in the position shown in Fig. 23.

In the forward or stock-feeding movement of the carrier $k$ the end of the peg-strip which was advanced at the previous return movement of the carrier, as has been just described, is cut off by coming against the edge of a knife $u$, which is fastened to the frame of the machine, as best shown in Fig. 5, and in this movement of the carrier $k$ the peg-wood feed-roll, which is prevented from rotating by a brake or spring $w$, (see Figs. 23 and 24,) pressing frictionally against the shaft, passes the end of the pawl $t^5$, which engages the next tooth of the ratchet ready to advance the same at the next return movement of the carrier. In order to insure that the pawl $t^5$ shall pass but one tooth only of the ratchet $t^5$ in this movement, whatever may be the length of the travel or feed movement of the carrier, the said pawl is caused to accompany the ratchet after the latter has moved past the pawl a distance equal to or a trifle greater than the length of one tooth of the ratchet. To effect this, the peg-wood guide-piece $t$ is provided with a shoulder or projection $y$, (shown as a head or enlargement at the end of a bolt screwed into the peg-wood guide for the purpose of adjustment,) said shoulder engaging with a corresponding shoulder $y^3$ on the pawl carrier or slide $t^{51}$, which after such engagement is drawn along by the further movement of the carrier $k$ against the pressure of the spring $t^{53}$, which in the return movement of the carrier causes the pawl to travel with the ratchet until the pawl-carrier $t^{51}$ brings up on the end of its guide $t^{52}$, after which the further movement of the awl and driver carrier $k$ causes the ratchet $t^4$ to turn and the peg-wood to be fed. This construction insures that the peg-wood feed-ratchet is advanced one tooth and one tooth only at each to-and-fro vibration of the awl and driver carrier, whatever may be the extent of said vibration, depending upon the length of feed desired for the material between consecutive pegs, it being necessary only to adjust the engaging shoulder $y$ to correspond to the size of the ratchet-teeth at any time used for feeding the peg-wood.

In order to guide the shoe during the pegging operation, the machine is provided with a gage $r$, (see Figs. 1 and 26 to 29,) which engages with the periphery of the sole and maintains it at a definite distance from the line of action of the awl and driver during the pegging operation.

It is common in pegging shoes to drive parallel rows of pegs around the sole or a portion thereof, and is therefore necessary to guide the shoe in two different paths for driving the two rows of pegs. The gage, is in accordance with this invention, provided with a shifting device by which it can quickly be thrown from one to the other position, according as the pegs are to be nearer to or farther from the edge, without interrupting the operation of the machine.

The gage proper, $r$, is shown as a horizontal roller supported at the end of a carrying bar or shank $r^2$, which is itself adjustably secured to a slide $r^3$ by screws $r^4$, passing through longitudinal slots in said shank $r^2$, as indicated in dotted lines, Fig. 28. The slide $r^3$ works in a guideway $r^5$, provided with a shank $r^6$, detachably secured and vertically adjustable in a socket in the main frame $r$ by a set-screw $r^7$, (see Fig. 1,) the position of said guide $r^5$ being determined by a steady-pin $r^8$, also entering a suitable socket in the main frame. Thus the gage may be raised or lowered with relation to the presser-foot P, or may be wholly removed from the machine, if desired. The slide $r^3$ is normally pressed to the rearward by a spring $r^{30}$, (see Fig. 29,) bearing against a plunger, which in turn bears against a stud $r^{31}$ at the rear end of the slide, the rearward movement of which is limited by the lower end of the steady-pin $r^8$, entering a slot $r^{32}$ in the slide $r^3$. Thus with the slide in its rearmost position (indicated by dotted lines, Fig. 29) the gage may be set by adjusting the bar $r^2$ on said slide to give the maximum distance for the pegs from the edge of the shoe, as in pegging the inner row of pegs. In order to move the gage to the nearer position for pegging the outer row of pegs, the slide $r^3$ is provided with a cam $r^{10}$, (see Fig. 29,) operated by a handle-lever or shifting device $r^{12}$, having its fulcrum at $r^{13}$ in a fulcrum-piece $r^{14}$. When the lever is disengaged from the cam, as shown in dotted lines, Fig. 29, the slide and gage are thrown rearward by the spring $r^{30}$ until arrested by the pin $r^8$ at the end of the slot $r^{32}$, but when the said handle-lever is thrown against the said cam it forces the slide forward until the handle-lever comes to rest in the notch or shoulder formed at the end of the cam $r^{10}$, as shown in Fig. 29, when it positively resists the rearward movement of the slide and gage and remains locked thereto until positively thrown out of the notch by the operator.

In order that the distance between the forward and rearward positions of the gage, and consequent distance between the rows of pegs, may be varied as required in different kinds of work, the fulcrum-piece $r^{14}$ for the gage-shifter $r^{12}$ is adjustable, being pivotally connected at $r^{15}$ with the guideway $r^5$, and provided at its other end with a screw or clamping device $r^{16}$, engaging with the guideway $r^5$ of the slide in a curved slot $r^{50}$, (see Fig. 26,) so that the outer end of the fulcrum-piece $r^{14}$ may be swung around its axis at $r^{15}$, thus moving the fulcrum $r^{13}$ of the shifting-lever forward or back, so that the said shifting-lever will throw the slide a greater or less distance forward when turned into engagement with the cam $r^{10}$.

Suitable gage marks or graduations are provided along the edge of the gage-guide, as shown in Figs. 1, 26, and 28, to indicate the positions at which the fulcrum-piece $r^{14}$ should be set for different distances desired between the rows of pegs.

While the hereinbefore-described mechanisms for actuating the working parts of the machine—viz., awl, driver, and peg-tip-cutting device—are extremely simple, compact, and efficient, it is obvious that various modifications might be made therein without departing from the essential features of the invention, and other mechanisms for giving the essential novel movements of the awl and awl-guide and elements that coöperate therewith to perform the essential operations of pegging are regarded as substantially equivalents for those herein shown and described.

We claim—

1. The combination of a rotatable horn or work-support provided with a work-supporting surface, and with a pair of cutting-jaws both movable with relation to said surface, and actuating mechanism therefor, substantially as described.

2. The combination of the rotatable horn or work-support, with a pair of cutting-jaws operating in a direction transverse to the plane of the horn, both of said jaws being movable toward and from the axis of the horn, and actuating mechanism therefor, substantially as described.

3. The combination of the rotatable horn, with a removable horn-tip and cutting device supported and operating in said horn-tip and removable therewith from the horn, substantially as described.

4. In a pegging-machine, a vertically-movable horn or work-support capable of complete rotation and having a tip or cover provided with a central perforation concentric with the axis of rotation of the horn, combined with a cutting device supported in said horn and operating below said perforation in the tip thereof, and peg-driving mechanism, and connecting mechanism substantially as described between said peg-driving mechanism and said cutting device whereby the latter is operated at each peg-driving operation unaffected by the vertical and rotary movement of the horn, substantially as described.

5. The combination of the horn or work-support capable of complete rotation and having a tip provided with a perforation concentric with the axis of rotation of the horn, a cutting device in said horn and means to move it to cut the peg-tip, a pegging mechanism comprising an awl and driver and means for moving said awl and driver laterally to feed the material, and actuating mechanism for driving the awl longitudinally into the material at or near the beginning of said lateral feed movement, and for moving the awl wholly through the material at the completion of said lateral movement, substantially as described.

6. The combination of the horn or work-support, and a peg-tip-cutting device therein, with a pegging mechanism comprising a peg-driver, and an independently-movable awl and awl-guide, and means for moving the same laterally to feed the material; and actuating mechanism for producing independent longitudinal movements of said awl and awl-guide, substantially as and for the purpose described.

7. The combination of the presser-foot and vertically-yielding horn or work-support, with a pegging mechanism comprising an awl and peg-driver, and means for moving the same laterally and depressing the material from the presser-foot to feed the material, and actuating mechanism for producing a partial longitudinal movement of the awl whereby it enters the material, but does not project therethrough during the lateral feed movement of the awl, and is caused to pass wholly through the material when said lateral feed movement is not taking place, substantially as described.

8. The combination of the horn or work-support, with a pegging mechanism comprising an awl and peg-driver, and means for positively reciprocating the same laterally to feed the material, and actuating mechanism for producing a partial longitudinal movement of the awl whereby it enters the material, but does not project therethrough during the lateral feed movement of the awl, and is caused to pass wholly through the material when said lateral feed movement is not taking place, substantially as described.

9. The combination of the awl and independently-movable awl-guide with actuating mechanism for producing independent longitudinal movements of said awl and awl-guide, substantially as described.

10. The combination with a yielding upwardly-pressed work-support and a presser-foot or work-clamp coöperating therewith, of an awl and awl-guide and laterally-moving carrier therefor, and actuating mechanism for producing a lateral movement of said carrier, and independent longitudinal movements of said awl and awl-guide, substantially as described.

11. The combination of the horn or work-support; with the pegging mechanism comprising a peg-driver, and an awl, and independently-movable awl-guide, and means for moving the same laterally to feed the material, and actuating mechanism for producing independent longitudinal movements of said awl and awl-guide, substantially as and for the purpose described.

12. The combination of the horn or work-support having a tip provided with a perforation, and a cutting device in said horn operating below the perforation in its tip; with a pegging mechanism comprising a peg-driver, and an independently-movable awl and awl-guide, and means for moving the same laterally to feed the material; and actuating mechanism for producing independent longitudinal movements of said awl and awl-guide, substantially as and for the purpose described.

13. The combination of the rotatable horn having a tip provided with a central opening concentric with the axis of rotation of the horn, of a pair of pivotally-connected cutting-jaws operating in the horn-tip below the opening thereof and actuating mechanism for intermittingly operating said cutting-jaws, substantially as described.

14. The combination of the main supporting-frame or base with a horn or work-support and supporting-bearing therefor, vertically adjustable on said base, and a machine-head-supporting column also vertically adjustable on said base, substantially as described.

15. The combination of the main supporting-frame or base with a horn or work-support and supporting-bearing therefor, vertically adjustable on said base, and a machine-head-supporting column also vertically adjustable on said base, and engaged with said horn whereby equal vertical adjustment of the machine-head and horn is secured, substantially as described.

16. The combination of the horn or work-support, of the peg-driving mechanism comprising an awl and driver, and actuating mechanism and a supporting-frame therefor, and means for adjusting said frame of the peg-driving mechanism in a horizontal direction on the supporting-column whereby the plane of the awl and driver may be brought into proper alinement with the horn, substantially as described.

17. The combination of the rotatable horn and supporting-bearing therefor with a non-rotating horn-depressing link, a cutter in said horn and actuating connections therefor comprising a rod passing through the shank of the horn and rotating therewith, and an actuator for said rod having a bearing-support in said horn-depressing link, substantially as described.

18. The combination of the horn-bearing, with the horn having a shank rotatably supported in said bearing, a spring contained in the shank of the horn and engaged at one end therewith, a support for the other end of the spring, an annulus fixed to the horn-shank below the lower end of its bearing-socket, and an annulus loosely encircling the horn-shank between the annulus fixed thereon and the lower end of the bearing-socket, and means connected with said loose annulus for depressing the horn against the stress of the spring therein, substantially as described.

19. The combination of the horn-bearing, with the horn having a shank rotatably supported in said bearing, a spring contained in the shank of the horn and engaged at one end therewith, a support for the other end of the spring, an annulus fixed to the horn-shank below the lower end of its bearing, and an annulus loosely encircling the horn-shank between the annulus fixed thereon and the lower end of the bearing, means connected with said loose annulus for depressing the horn against the stress of the spring therein, and an antifriction-bearing between said loose annulus and said fixed annulus, and an antifriction-bearing at one end of the spring, substantially as described.

20. The combination of the material-feeding and peg-driving mechanism of a pegging-machine, with a gage for the material to be operated upon, a spring-pressed slide for said gage, provided with a cam having a locking-shoulder and a gage-shifter coöperating with said cam whereby said slide is shifted and locked against the stress of its spring or released for movement by its spring, substantially as described.

21. The combination of the material-feeding and peg-driving mechanism of a pegging-machine, with a gage for the material to be operated upon, a spring-pressed slide for said gage, and a shifting-lever for said slide, and adjustable fulcrum-piece for said shifting-lever, substantially as described.

22. The combination of the material-feeding and peg-driving mechanism of the pegging-machine, with a gage for the material to be operated upon, and means for connecting the same with the framework of the pegging mechanism having provision for vertical adjustment with relation thereto, substantially as described.

23. The combination of the horn or work-support, with the peg-driving mechanism comprising an awl and driver, an actuating mechanism and supporting-frame therefor, and means for adjusting the said frame of the peg-driving mechanism with relation to the horn in a direction at right angles to the plane through the awl and driver and also in the direction of the said plane whereby the awl and driver may be accurately located with reference to the axis of the horn, substantially as described.

24. The combination of the awl and driver, with a carrier therefor having a rectilinear vibrating movement and provided with opposite cam-engaging surfaces, and a cam interposed between and engaging with said surfaces, having portions of its periphery concentric but of different radius and connected by curves such that the distance across the cam between opposite tangential engaging surfaces is constant for all positions of the cam, substantially as described.

25. The combination of the awl and driver, with a carrier therefor, and an actuating-cam continuously engaged at opposite sides with said carrier which is provided with adjustable bearing-pieces for engagement with said cam, substantially as described.

26. The combination of the awl and driver bars and the vibrating carrier therefor, with the feed-cam $k^4$ engaged at opposite sides with said carrier whereby the latter is moved positively in both directions, substantially as described.

27. The combination of the driver-bar, with the actuating rocker-arm therefor pivotally supported in the frame and the actuating spiral spring and spring-support, said spring having its ends in line with the axis thereof and secured in the said arm and spring-support respectively, and said spring-support being adjustably secured to the bearing-support of said actuating-arm, substantially as described.

28. The combination of the awl-bar and actuating rock-shaft therefor provided with a slotted arm, of the actuating-cam and the slide actuated thereby and connected with said arm in the slot thereof whereby the movement of the awl may be varied, substantially as described.

29. The combination of the awl-bar, with the actuating rock-shaft therefor provided with arms, one connected with the said awl-bar; and an actuating-cam and slide actuated thereby connected with the other arm of said rock-shaft; and means for angularly adjusting one of said arms on said rock-shaft, substantially as and for the purpose described.

30. The combination of the awl and driver, with a carrier therefor provided with guide-pins $k^2$ and supporting-guideways therefor, and the cam $k^4$ for positively actuating said carrier in both directions, substantially as described.

31. The combination of the vibrating carrier and peg-driver supported thereon, with the peg-wood guide supported on said carrier, and vibrating therewith, the peg-wood feed roll and ratchet on said carrier, and the pawl and pawl-carrier coöperating with said ratchet and means for engaging said peg-wood guide and pawl-carrier whereby the latter may be caused to accompany the former during a portion of its vibratory movement, substantially as described.

32. The combination of the peg-wood feed-ratchet $t^4$ and transversely-vibrating support therefor, with the pawl $t^5$ and movable spring-pressed pawl-carrier $t^{51}$, said ratchet-support and pawl-carrier being provided with coöperating engaging projections $y\ y^3$, substantially as and for the purpose described.

In testimony whereof we have signed our names to this specification in the presence of two subscribing witnesses.

JOHN F. DAVEY.
SHERMAN W. LADD.

Witnesses:
FRANK WOODBERRY,
GEORGIE A. STONE.